May 5, 1942.  B. H. SMITH  2,282,257

THERMAL TYPE DEMAND METER

Filed July 12, 1940

WITNESSES:
C. J. Weller.
David Kreider.

INVENTOR
Benjamin H. Smith.
BY
ATTORNEY

Patented May 5, 1942

2,282,257

UNITED STATES PATENT OFFICE 2,282,257

THERMAL TYPE DEMAND METER

Benjamin H. Smith, Bloomfield, N. J., assignor to Westinghouse Electric & Manufacturing Company, East Pittsburgh, Pa., a corporation of Pennsylvania Application July 12, 1940, Serial No. 345,095

5 Claims. (Cl. 171—34)

The present invention relates to a thermal device for measuring the maximum demand of an electrical quantity and it has particular relation to a device such as is used in conjunction with a watthour meter for measuring the maximum ampere demand of a load circuit.

Although they may be employed for measuring practically any electrical quantity, thermal demand devices offer particular advantages over other types of meters for measuring maximum current demand. A description of the structure and use of a device of the type to which this improvement may be applied will be found in U. S. Patent No. 2,120,311 to E. L. Keller.

It has been found, however, that more refined adjustments than have been provided in the past are necessary with this type of device to attain the desired accuracy. According to the present invention a thermal demand meter of the type employing a thermal responsive arrangement for compensating for changes in ambient temperature is provided with a movable attaching member for adjusting the relationship between the two thermal elements to balance the compensating effect at various external temperatures. In addition, this member is also movable to provide a zero adjustment. A variable resistance may also be employed in the heating circuit to facilitate full scale calibration.

It is, accordingly, an object of the invention to provide a novel and improved device for measuring the maximum demand of an electrical quantity.

Another object of the invention is to provide a thermal maximum demand device which operates with improved accuracy.

A further object of the invention is to provide a thermal maximum demand device which permits more refined adjustments than have heretofore been available.

Still another object of the invention is to provide a thermal maximum demand device having an ambient temperature compensator and which may readily be adjusted to obtain proper balance between the compensator and the main thermal element.

Other objects and advantages of the invention will appear in the following detailed description taken in conjunction with the accompanying drawing, in which.

Figure 1:
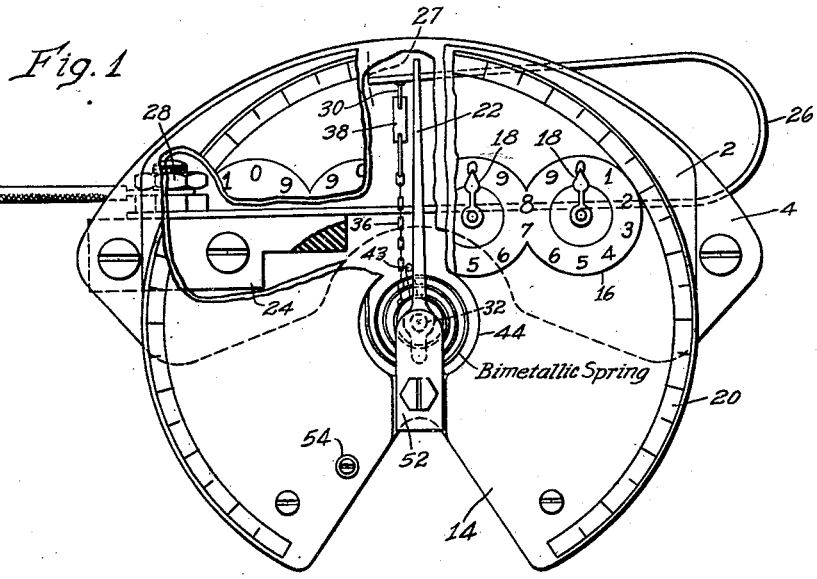
Figure 1 is a front elevational view, with parts broken away, of a watthour meter register employing a maximum demand meter embodying the present invention.

Referring to the drawing, there is shown a watt hour meter register having a front plate 2, a central plate 4, and a rear plate 6 which are assembled together in a usual manner to support a register gear train 8. Supporting studs 10 are provided for securing the device upon a watthour meter in such manner that a first gear 12 engages the driving spindle of the meter to be driven thereby. Upon the front plate 2 is attached an indicating card 14 having dial portions 16 cooperating with pointers 18 to register the power passing through the meter. The card 14 is also provided with graduations at 20 for cooperation with a maximum demand pointer 22.

An insulating block 24 is secured to the register frame as indicated and supports a thermal responsive element 26 which is preferably of bimetallic construction bent into a substantially U-shape as shown. The thermal responsive element 26 is preferably split along the center for a portion of its length to provide a path for a heating current to pass therethrough to cause the free end thereof to move in the arcuate path indicated by the dotted line at 27. Although it is evident that a separate heating device may be employed, it is preferred to use the construction shown and provide terminals at 28 for energizing the element so that a current proportional to the quantity to be measured passes therethrough.

To the movable end of the element 26 is secured a hook member 30 which is bendable for a purpose which will hereinafter be described. A shaft 32 is rotatably supported by the register plate 4 and by a front bearing member 34 which is secured to the front register plate 2. A chain 36 is attached to the periphery of the shaft 32 and wrapped around a portion thereof while its other end engages an insulating link 38 which, in turn, is attached to the movable hook 30. A spiral bimetallic spring 40 is attached to the register frame at 42 and to the shaft 32 to bias the shaft against motion imparted thereto through the chain 36 upon the free end of the element 26 moving in response to increase in temperature. The thermo-responsive properties of this spring are such that its biasing force increases with temperature increases to compensate for displacements of the main element 26 due to ambient temperature changes.

Attached to the forward end of the shaft 32 to move therewith is a pusher member 43 which extends through an arcuate hole 44 in the plate 2 and indicating card 14. This member 43 is arranged to engage a pointer or indicator 22 which is pivoted concentrically with the shaft 32 at 48. Although free to rotate about the pivot, this pointer member is attached to a felt washer 50 and biased thereagainst by means of a spring 52 whereby it will remain in any position to which it is displaced by the pusher 43. A stop member 54 is attached to the register frame as shown.

Figures 2, 3:
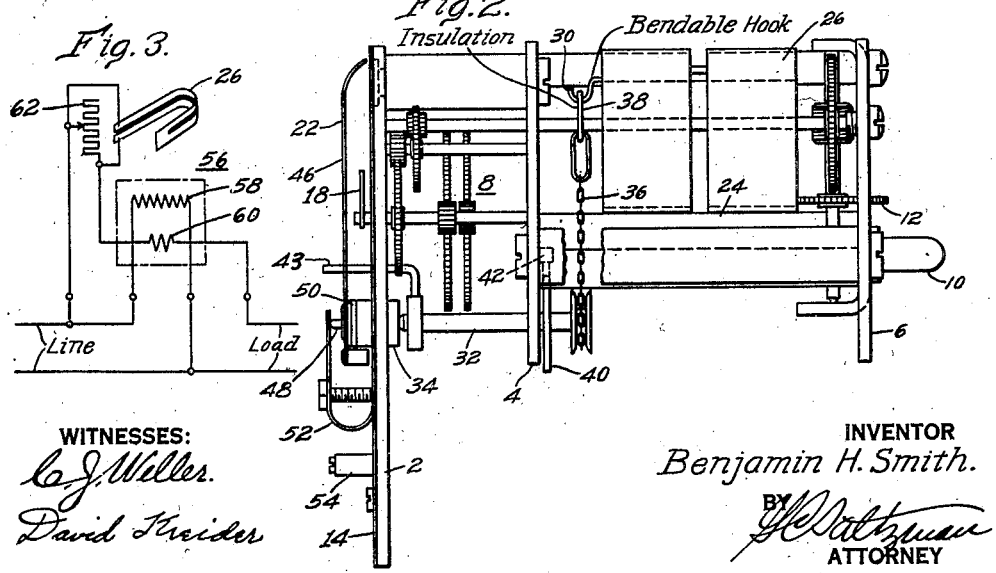
Fig. 2 is a side elevational view with parts broken away of the device of Fig. 1.
Fig. 3 is a wiring diagram showing a method of employing the device in conjunction with an electric watthour meter.

In Fig. 3, electrical connections which the device may make with a watthour meter when employed to measure ampere demand is shown. In this figure a watthour meter 56, including a voltage coil 58 and current coil 60, is connected across an electrical line in a usual manner. The thermal responsive element 26 is connected in series with the current coil while a variable resistance 62 is connected in shunt with the element 26 to facilitate full load calibration of the device.

In operation the thermal responsive element 26 is heated in accordance with the current passing therethrough and its free end to which the hook 30 is secured is displaced upwardly in proportion to the amount it is heated. This upward displacement of the element is transmitted through the chain 36 to displace the shaft 32 a proportional rotary amount in the direction in which the chain is wound around it. The motion of the shaft causes the pusher element 43 to push the maximum demand indicator 46 through a proportionate distance on the indicating card 14.

While the bimetallic spring 40 is arranged to furnish an increased bias against the motion of the element 26 upon increases in ambient temperature, it will be evident that this ordinarily cannot be made to completely compensate for the displacement of the member 26 due to such ambient temperature changes throughout a wide range. For this reason the hook 30 is made bendable so that it may be adjusted in a horizontal plane perpendicular to the paper in Fig. 1 to provide an accurate balance between the two effects at approximately the center of the range of ambient temperature variation encountered for a particular installation. In addition, the hook may be moved vertically to effectively shorten or lengthen the chain 36 to adjust the device to zero position.

The variable resistance 62 is provided across the terminals 28 of the thermal responsive element 26 to permit full-scale calibration. This may be done by adjusting the resistance to shunt away a portion of the current and thus provide means for obtaining a very refined adjustment.

Figures 4, 5:
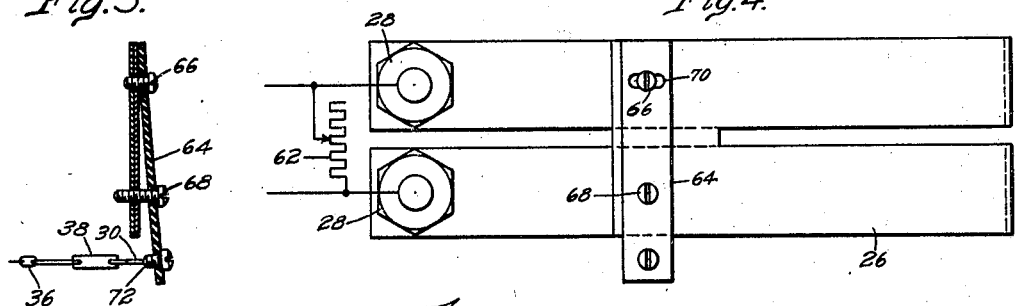
Fig. 4 is an enlarged plan view of the main thermal element employed in Figs. 1 and 2 but with a modified form of adjusting device.
Fig. 5 is a side elevational view, partly in section, of a portion of the apparatus of Fig. 3.

In Fig. 4, a bar 64, which is preferably of non-conducting material, is secured to the free end of the thermal responsive element 26 by means of bolts 66 and 68, the former of which extends through an elongated slot 70 in the bar. A portion of this bar extends past the edge of the element as shown and the hook member is secured to this projecting portion as shown at 72. The chain 36 engages this hook member at its upper end, while the remainder of the device is constructed as previously described. In this case, however, the adjustment for balancing the compensating arrangement for ambient temperature is made by pivoting the bar about the front bolt 68, as is possible because of the elongated groove 70. It will be evident that such movement will be permitted upon loosening the bolt 66 and that after adjustment the bar may be secured in its new position by tightening the same bolt. To obtain zero adjustment with this modified attaching means, it is merely necessary to adjust the vertical position of the bar at the bolt 68. Although further refinements of this latter arrangement will appear, the construction shown permits all the adjustment required for the purpose and is preferred because of its simplicity.

From the above description it will appear that the invention permits greatly increased accuracy to be obtained with a thermal type maximum demand device. By employing means for adjusting the effective radius of travel of the thermal responsive element in the manner shown, it is possible to accurately balance the ambient temperature compensation for any installation. In addition, the zero adjustment provided is particularly simple and accurate. The variable resistance provides an arrangement whereby an accurate full scale calibration may be readily attained.

Since various modifications may be made in the apparatus shown and described without departing from the spirit and scope of the invention, it is intended that the invention be limited only by the appended claims interpreted in view of the prior art.

I claim as my invention:

1. In a maximum demand device wherein a thermo-responsive element is displaced in an arcuate path in accordance with the magnitude of an electrical quantity to be measured, a rotatable member, an attaching member secured to said thermo-responsive element for displacement in an arcuate path therewith, a flexible member connecting said attaching member to said rotatable member to displace the latter said member in a predetermined rotary direction in proportion to the displacement of said thermo-responsive element, a thermo-responsive spring member to bias said rotatable member against the motion of said thermo-responsive element to compensate for displacements due to changes in ambient temperature, said attaching member being adjustable to change the effective radius of displacement of said thermo-responsive element to balance the effect of ambient temperature changes on said thermo-responsive element and said spring member, and means operatively associated with said rotatable member to indicate the maximum displacement thereof.

2. In a maximum demand device wherein a thermo-responsive element is displaced in an arcuate path in accordance with the magnitude of an electrical quantity to be measured, a rotatable member, a hook member attached to said thermo-responsive member for displacement in an arcuate path therewith, a flexible member connecting said hook member to said rotatable member to displace the latter said member in a predetermined rotary direction in proportion to the displacement of said thermo-responsive element, a thermo-responsive spring member to bias said rotatable member against the motion of said thermo-responsive element to compensate for displacements due to change in ambient temperature, said hook member being flexible in a first direction to permit adjustment of said rotatable member to a predetermined zero position and in a second direction substantially perpendicular to said first direction to permit balancing of the compensating action of said spring member, and means operatively associated with said rotatable member to indicate the maximum displacement thereof.

3. In a maximum demand instrument wherein a thermo-responsive element is displaced in an arcuate path in accordance with the magnitude of an electrical quantity to be measured, a rotatable member, a supporting bar attached to said thermo-responsive element and projecting beyond an edge thereof for displacement in an arcuate path therewith, a flexible member connecting the projecting portion of said supporting bar to said rotatable member to displace the latter said member in a predetermined rotary direction in proportion to the displacement of said thermo-responsive element, a thermo-responsive spring member to bias said rotatable member against the motion of said thermo-responsive element to compensate for displacements due to changes in ambient temperature, said supporting bar being independently adjustable in a first plane relative to said element to set said rotatable member to a predetermined zero position and in a second plane substantially perpendicular to said first plane to balance the compensating action of said spring member by adjusting the effective radius of its path of travel, and means operatively associated with said rotatable member to indicate the maximum displacement thereof.

4. In a maximum demand device wherein a thermal responsive element is displaced in an arcuate path in accordance with the magnitude of an electrical quantity to be measured, a rotatable member, attaching means secured to said thermal responsive element for displacement in an arcuate path therewith, a flexible driving member connecting said attaching means to said rotatable member to displace the latter said member in a predetermined rotary direction in proportion to the displacement of said thermal responsive element, a thermal responsive spiral spring secured about said rotatable member to bias it against the motion of said thermal responsive element to compensate for displacement due to changes in ambient temperature, said attaching means being independently adjustable along the line of said driving member to permit setting said rotatable member to a predetermined zero position and in a plane substantially perpendicular to said first line of adjustment to permit adjustment of the effective radius of the arcuate path of its movement for balancing the effect of ambient temperature changes on said thermal responsive element and spring, and means operatively associated with said rotatable member to indicate the maximum displacement thereof.

5. In a maximum demand instrument wherein a thermal responsive element is displaced in an arcuate path in accordance with the magnitude of an electrical quantity to be measured, a rotatable member, a supporting bar including an attaching member at an end thereof, means for securing said supporting bar to said thermal responsive element with its attaching member extending beyond an edge thereof for displacement in an arcuate path therewith, a flexible chain connecting the attaching member on said supporting bar to said rotatable member to displace the latter said member in a predetermined rotary direction in proportion to the displacement of said thermal responsive element, a thermal responsive spring member for biasing said rotatable member against the motion of said thermal responsive element to compensate for changes in ambient temperature, said securing means being adjustable to move said supporting bar in a plane substantially perpendicular to said element to set said rotatable member to a predetermined zero position and in a plane substantially parallel to said element to balance the effect of ambient temperature changes on said thermal responsive element and spring member, and means operatively associated with said rotatable member to indicate the maximum displacement thereof.

BENJAMIN H. SMITH.